(12) United States Patent
Nakamura

(10) Patent No.: US 10,974,678 B2
(45) Date of Patent: Apr. 13, 2021

(54) INSTRUMENT PANEL STRUCTURE

(71) Applicant: TOYOTA JIDOSHA KABUSHIKI KAISHA, Toyota (JP)

(72) Inventor: Manami Nakamura, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 16/272,144

(22) Filed: Feb. 11, 2019

(65) Prior Publication Data
US 2019/0270424 A1    Sep. 5, 2019

(30) Foreign Application Priority Data

Mar. 2, 2018  (JP) .............................. JP2018-037689

(51) Int. Cl.
*B60R 21/045* (2006.01)
*B29C 44/12* (2006.01)
(Continued)

(52) U.S. Cl.
CPC ........ *B60R 21/045* (2013.01); *B29C 44/1257* (2013.01); *B29L 2031/3008* (2013.01);
(Continued)

(58) Field of Classification Search
CPC ............ B60R 21/045; B32B 2605/003; B32B 27/065; B32B 27/18; B32B 27/304; B32B 27/32; B32B 27/40; B32B 27/365; B32B 2250/03; B32B 2250/24; B32B 2266/0278; B32B 2327/06; B32B 2323/10; B32B 2369/00; B32B 2375/00; B32B 2398/10; B32B 7/08; B32B 3/02; B32B 2262/101;
(Continued)

(56) References Cited

U.S. PATENT DOCUMENTS 2,890,919 A * 6/1959 Hansen ................ A47B 77/022
                                              108/27
2,903,388 A * 9/1959 Lintner ............... B29C 45/1418
                                              264/258
(Continued)

FOREIGN PATENT DOCUMENTS

JP          H06-33726 U    5/1994
JP          2001-233087 A  8/2001

*Primary Examiner* — Paul N Dickson
*Assistant Examiner* — Timothy Wilhelm
(74) *Attorney, Agent, or Firm* — Oliff PLC

(57) ABSTRACT

An instrument panel structure includes: a base material that has both end portions in the longitudinal direction bent toward the lower face side to form a side face portion; a foamed material that covers a surface of the base material; and a skin that covers a surface of the foamed material. The instrument panel structure also includes a sealing rib that protrudes outward in the longitudinal direction from the side face portion in an arrangement position spaced apart by a predetermined gap toward the lower face side from a bent position of the base material, and to which an end portion of the skin is joined. The instrument panel structure also includes a widening rib that protrudes outward in the longitudinal direction from the side face portion on an upper face side of the arrangement position of the sealing rib on the side face portion, and is covered with the foamed material.

5 Claims, 5 Drawing Sheets

(51) Int. Cl.
| | |
|---|---|
| B32B 27/06 | (2006.01) |
| B32B 27/18 | (2006.01) |
| B32B 27/30 | (2006.01) |
| B32B 27/32 | (2006.01) |
| B32B 27/40 | (2006.01) |
| B32B 27/36 | (2006.01) |
| B32B 7/08 | (2019.01) |
| B29L 31/30 | (2006.01) |

(52) U.S. Cl.
CPC ............ *B32B 7/08* (2013.01); *B32B 27/065* (2013.01); *B32B 27/18* (2013.01); *B32B 27/304* (2013.01); *B32B 27/32* (2013.01); *B32B 27/365* (2013.01); *B32B 27/40* (2013.01); *B32B 2250/03* (2013.01); *B32B 2250/24* (2013.01); *B32B 2266/0278* (2013.01); *B32B 2323/10* (2013.01); *B32B 2327/06* (2013.01); *B32B 2369/00* (2013.01); *B32B 2375/00* (2013.01); *B32B 2398/10* (2013.01); *B32B 2605/003* (2013.01)

(58) Field of Classification Search
CPC ..... B32B 2250/40; B32B 27/302; B32B 5/20; B32B 27/20; B32B 1/00; B32B 3/08; B32B 3/30; B32B 5/18; B32B 27/08; B32B 2605/00; B32B 3/04; B60K 37/00; B62D 25/14; B62D 21/157; B62D 65/14; B29C 44/1257; B29L 2031/3005; B29L 2031/3008

See application file for complete search history.

(56) References Cited

U.S. PATENT DOCUMENTS

| | | | | | |
|---|---|---|---|---|---|
| 4,478,664 | A | * | 10/1984 | Elias | B29C 63/04 156/216 |
| 4,530,517 | A | * | 7/1985 | Miyabayashi | B60R 21/045 180/90 |
| 4,994,226 | A | * | 2/1991 | Nakagawa | B29C 45/14795 264/261 |
| 5,022,943 | A | * | 6/1991 | Zaima | B29D 24/005 156/222 |
| 5,082,078 | A | * | 1/1992 | Umeda | B62D 25/081 180/90 |
| 5,082,310 | A | * | 1/1992 | Bauer | B26D 3/085 280/728.3 |
| 5,715,966 | A | * | 2/1998 | Nagano | B32B 3/02 220/837 |
| 5,804,117 | A | * | 9/1998 | Baba | B29C 45/14 264/161 |
| 5,831,225 | A | * | 11/1998 | Campbell | F02B 77/13 181/284 |
| 5,854,452 | A | * | 12/1998 | Campbell | B62D 29/048 181/290 |
| 5,934,733 | A | * | 8/1999 | Manwaring | B62D 25/145 280/752 |
| 6,050,631 | A | * | 4/2000 | Suzuki | B60R 13/0206 280/751 |
| 6,371,551 | B1 | * | 4/2002 | Hedderly | B60K 37/00 180/90 |
| 6,550,835 | B2 | * | 4/2003 | Davis, Jr. | B60K 37/00 296/37.12 |
| 6,558,604 | B1 | * | 5/2003 | Beckmann | B29C 43/18 264/319 |
| 6,632,388 | B1 | * | 10/2003 | Sanae | B29C 37/0057 264/138 |
| 6,756,004 | B2 | * | 6/2004 | Davis, Jr. | B29C 45/1635 264/255 |
| 6,843,521 | B1 | * | 1/2005 | Oana | B62D 25/145 180/90 |
| 7,185,947 | B2 | * | 3/2007 | Boehm | B60H 1/0055 296/208 |
| 7,201,434 | B1 | * | 4/2007 | Michalak | B60K 37/00 280/752 |
| 7,571,956 | B2 | * | 8/2009 | Gunther | B62D 25/14 248/115 |
| 7,658,426 | B2 | * | 2/2010 | Hayakawa | B29C 44/1238 296/39.1 |
| 7,784,844 | B2 | * | 8/2010 | Sato | B29C 33/18 296/191 |
| 7,922,227 | B2 | * | 4/2011 | Beau | B60R 13/02 280/752 |
| 7,946,640 | B2 | * | 5/2011 | Sato | B29C 44/1233 180/90 |
| 8,128,148 | B2 | * | 3/2012 | Kober | B62D 25/145 296/187.12 |
| 8,616,607 | B2 | * | 12/2013 | Zellner, Jr. | B60K 37/00 296/70 |
| 9,096,184 | B2 | * | 8/2015 | Twork | B32B 27/32 |
| 9,604,428 | B2 | * | 3/2017 | Walker | B29D 28/00 |
| 9,623,624 | B2 | * | 4/2017 | Muiter | B32B 7/12 |
| 9,802,383 | B2 | * | 10/2017 | Miyashita | B32B 3/30 |
| 10,464,280 | B2 | * | 11/2019 | Fox | B29C 43/02 |
| 10,518,642 | B2 | * | 12/2019 | Nishikawa | B32B 1/00 |
| 10,596,960 | B2 | * | 3/2020 | Park | B60Q 3/60 |
| 2005/0196600 | A1 | * | 9/2005 | Lee | B29C 44/351 428/304.4 |
| 2006/0175858 | A1 | * | 8/2006 | Pegorier | B60R 21/045 296/70 |
| 2007/0029763 | A1 | * | 2/2007 | Hayashi | B29C 66/532 280/728.3 |
| 2007/0160823 | A1 | * | 7/2007 | Pyzik | B32B 5/18 428/304.4 |
| 2008/0023979 | A1 | * | 1/2008 | Trillat | B60K 37/00 296/70 |
| 2008/0203754 | A1 | * | 8/2008 | Towne | B60R 13/0815 296/93 |
| 2008/0315621 | A1 | * | 12/2008 | Alvehav | B60R 21/045 296/146.7 |
| 2009/0283993 | A1 | * | 11/2009 | Finch | B60K 37/00 280/732 |
| 2013/0023192 | A1 | * | 1/2013 | Niwa | B60H 1/242 454/127 |
| 2013/0229024 | A1 | * | 9/2013 | Schidan | B60R 13/02 296/1.08 |
| 2014/0117700 | A1 | * | 5/2014 | Noah-Navarro | B60H 1/00535 296/70 |
| 2019/0092253 | A1 | * | 3/2019 | Weidner | B60R 13/0256 |
| 2019/0337388 | A1 | * | 11/2019 | Helot | B60K 37/00 |

* cited by examiner

INSTRUMENT PANEL STRUCTURE

CROSS REFERENCE TO RELATED APPLICATION

The entire disclosure of Japanese Patent Application No. 2018-037689 filed on Mar. 2, 2018, including the specification, claims, drawings, and abstract, is incorporated herein by reference in its entirety.

TECHNICAL FIELD

The present disclosure relates to an instrument panel structure, and more particularly to an instrument panel structure having a three-layered structure including a skin, a foamed material, and a base material.

BACKGROUND

In a vehicle, an instrument panel in which various instruments are arranged is provided below a front windshield and in front of a front seat. Since the instrument panel is a part viewed by a user such as a driver in the vehicle interior, excellent design is required.

As described in Japanese Utility Model Laid-Open No. Hei 6-33726, an instrument panel is formed of a resin material having a three-layered structure. The lowest of the three layers is a hard base material, the uppermost layer is a skin using a material that adds a high-class appearance to the car, and a layer between the base material and the skin is a soft foamed material that provides premium texture. The skin is formed by powder slush molding in which a thermoplastic resin powder is distributed on the inner side of a mold and melted. An end portion of the skin is joined to a general surface of the base material having less irregularities, to form a sealing surface for enclosing the foamed material between the skin and the base material.

JP 2001-233087 A describes that in an opening part provided in an instrument panel, a base material protrudes to a skin side while the skin protrudes to the base material side, and the parts are superimposed on one another to seal a foamed material. The skin has a part that is superimposed on an opening protrusion portion of the base material, and a projecting portion that passes the tip end of the opening protrusion portion of the base material and projects to the center side of the opening. Then, to prevent contraction of the skin in the projecting portion, a rib protruding to the skin side from the base material is provided so as to surround the entire perimeter of the opening.

SUMMARY

Technical Problem

There is a demand for an excellently designed and basically horizontal instrument panel in the vehicle interior. In an instrument panel, a skin and a base material are joined to form a sealing surface that encloses a foamed material, on a general surface of both side face portions in the longitudinal direction of the base material. In this case, both end portions in the longitudinal direction of the instrument panel can only be extended outward by the thickness of the foamed material from the position of the general surface of the side face portion of the base material. The instrument panel can be widened in the longitudinal direction if the position of the general surface of the side face portion of the base material can be moved outward along the longitudinal direction.

However, when an instrument panel is installed in a vehicle, a mating surface of a flange of a side panel which is a component of a vehicle body is placed on both sides of the instrument panel. Accordingly, there is a limit to moving the general surface of the side face portion of the base material outward along the longitudinal direction.

When an instrument panel is installed in a vehicle, a top face of the instrument panel is positioned higher than the upper end of a side panel. Hence, by increasing the thickness of a foamed material in both end portions in the longitudinal direction of the instrument panel on the upper face side of positions corresponding to the upper end of the side panels, the instrument panel can be widened in the longitudinal direction. However, since the gap between the base material and the skin is widened, the filling factor of the foamed material decreases, and texture of the part perceived by the user cannot be maintained.

Hence, there is a demand for an instrument panel structure that can widen an instrument panel in the longitudinal direction while maintaining texture perceived by the user.

Solution to Problem

An instrument panel structure of the present disclosure is an instrument panel structure whose longitudinal direction is arranged between left and right side panels in a vehicle width direction, the instrument panel structure including: a base material that has both end portions in the longitudinal direction bent toward a lower face side to form side face portions; a foamed material that covers a surface of the base material; a skin that covers a surface of the foamed material; a sealing rib that protrudes outward in the longitudinal direction from the side face portion in an arrangement position spaced apart by a predetermined gap toward the lower face side from a bent position of the base material, and to which an end portion of the skin is joined; and a widening rib that protrudes outward in the longitudinal direction from the side face portion on an upper face side of the arrangement position of the sealing rib on the side face portion, and is covered with the foamed material.

According to the above configuration, since the skin may be joined with the tip end of the sealing rib instead of the side face portion of the base material, the thickness of the foamed material may be increased in both end portions in the longitudinal direction of the instrument panel, and the instrument panel may be widened in the longitudinal direction. Then, even when the thickness of the foamed material is increased in both end portions in the longitudinal direction of the instrument panel, since the foamed material is supported by the widening rib, texture perceived by the user may be improved. Accordingly, the instrument panel may be widened in the longitudinal direction while maintaining texture perceived by the user.

The instrument panel structure according to the present disclosure preferably includes a third rib that is provided in a region between the sealing rib and the widening rib along the side face portion, and is covered with the foamed material.

According to the above configuration, a third rib is provided in a region between the sealing rib and the widening rib. With this, texture of the region between the sealing rib and the widening rib may be maintained, and the sealing rib and the widening rib may be separated to allow wider variety in the design of the instrument panel.

In the instrument panel structure according to the present disclosure, the third rib preferably has one end connected to the sealing rib and the other end connected to the widening rib.

According to the above configuration, the strength of the instrument panel increases.

Advantageous Effects of Invention

According to the instrument panel structure of the above configuration, the width of the instrument panel may be increased while maintaining texture perceived by the user.

BRIEF DESCRIPTION OF DRAWINGS

An embodiment of the present disclosure will be described based on the following figures, wherein.

DESCRIPTION OF EMBODIMENTS

Hereinafter, an embodiment of the present disclosure will be described in detail with reference to the drawings. Shapes, dimensions, materials and the like in the following description are examples for purposes of illustration, and may be changed appropriately according to the specification of the instrument panel structure, for example. In the following description, in all of the drawings, the same element is assigned the same reference sign, and overlapping descriptions will be omitted.

Figure 1:
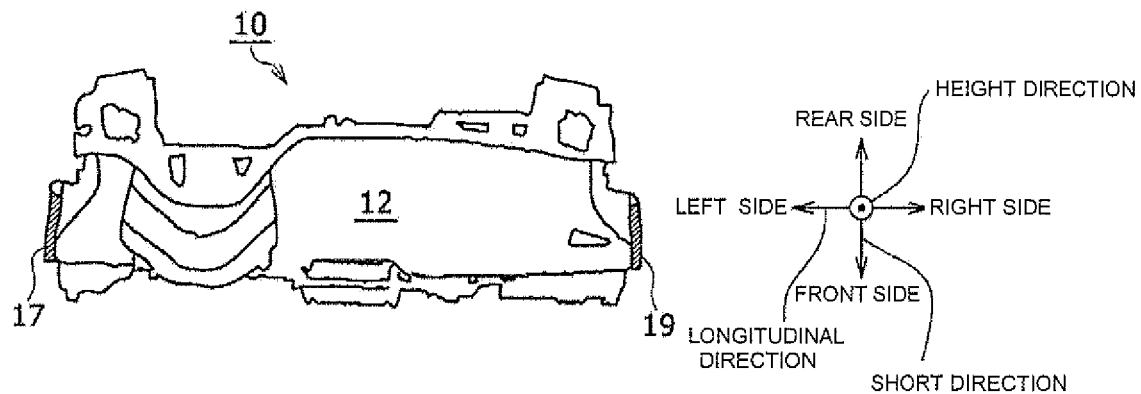
FIG. 1 is a diagram of an instrument panel having an instrument panel structure of an embodiment as viewed from the upper face side.
Figure 2:
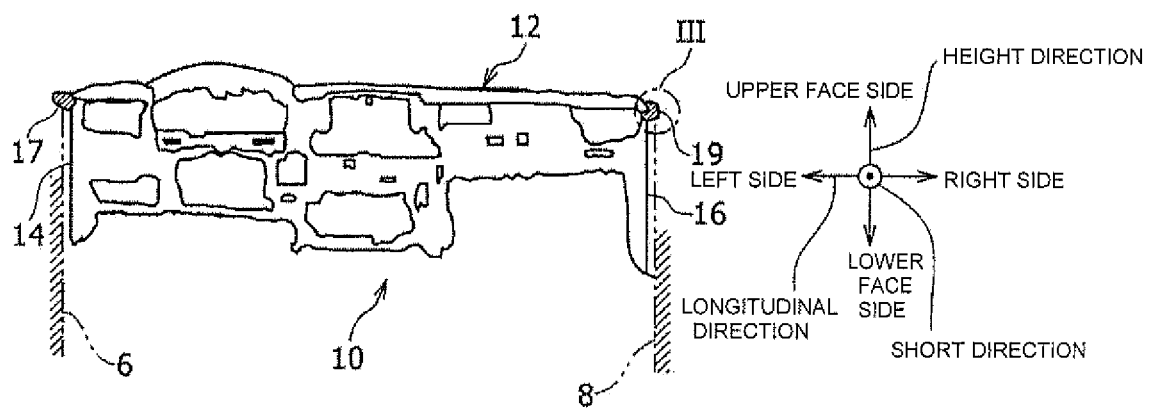
FIG. 2 is a diagram of the instrument panel of FIG. 1 as viewed from the rear side.

FIGS. 1 and 2 are diagrams showing an instrument panel 10 of a vehicle. The instrument panel 10 is an instrument panel as a collective entity of instruments and switches necessary for operation of a vehicle, provided below a front windshield and in front of a front seat in the vehicle, and in which multiple on-board devices are attached.

In the following drawings, a longitudinal direction, a short direction, and a height direction are indicated as three directions orthogonal to one another in the instrument panel 10. The longitudinal direction corresponds to the width direction of the instrument panel 10, and the short direction corresponds to the depth direction of the instrument panel 10. To distinguish between two directions in the short direction, when multiple on-board devices are attached to the instrument panel 10, the direction of the display faces of the on-board devices is defined as the front side, and the opposite direction is defined as the rear side. To distinguish between two directions in the longitudinal direction, when facing the rear side from the front side in the short direction, the right direction is defined as the right side, and the left direction is defined as the left side. As for the vertical direction, when the instrument panel 10 is placed in a direction in which displays of the on-board devices can be read correctly, the upper side is defined as an upper face side, and the lower side is defined as a lower face side.

When the instrument panel 10 is installed in a vehicle, the front side of the instrument panel 10 corresponds to the back side of the vehicle, the rear side of the instrument panel 10 corresponds to the front side of the vehicle. The left side of the instrument panel 10 corresponds to the left side of the vehicle, the right side of the instrument panel 10 corresponds to the right side of the vehicle, the upper face side of the instrument panel 10 corresponds to the upper side of the vehicle, and the lower face side of the instrument panel 10 corresponds to the lower side of the vehicle. FIG. 1 is a diagram of the instrument panel 10 as viewed from the upper face side, and shows an upper face 12 extending in the longitudinal direction.

FIG. 2 is a diagram of the instrument panel 10 as viewed from the rear side. The instrument panel 10 has left and right side face portions 14 and 16 which are both end portions in the longitudinal direction bent toward the lower face side. When the instrument panel 10 is installed in a vehicle, the left and right side face portions 14 and 16 are arranged between side panels 6 and 8 forming a body of the vehicle. In FIG. 2, the side panels 6 and 8 on the left and right sides in the vehicle width direction of a vehicle when the instrument panel 10 is installed in the vehicle are indicated by a chain double-dashed line. The gap between the side panels 6 and 8 is determined according to the specification of the vehicle, for example.

Although the longitudinal direction of the instrument panel 10 is limited by the gap between the side panels 6 and 8 of the vehicle in which the instrument panel 10 is installed, the design of the instrument panel 10 and the vehicle can be enhanced by widening the instrument panel 10 in the longitudinal direction within this range. Widening portions 17 and 19 indicated in FIGS. 1 and 2 are parts where the instrument panel 10 is widened in the longitudinal direction within the limit of the gap between the side panels 6 and 8 of the installed vehicle. Hereinbelow, details of the instrument panel structure in the widening portions 17 and 19 will be described. Since the instrument panel structure is basically the same in the widening portions 17 and 19, the following description will be given of an instrument panel structure 20 in the widening portion 19. In the drawings below, although the side panel 8 is not a component of the instrument panel structure 20, the side panel 8 is shown as a limit imposed when the instrument panel 10 is installed in a vehicle.

Figure 3:
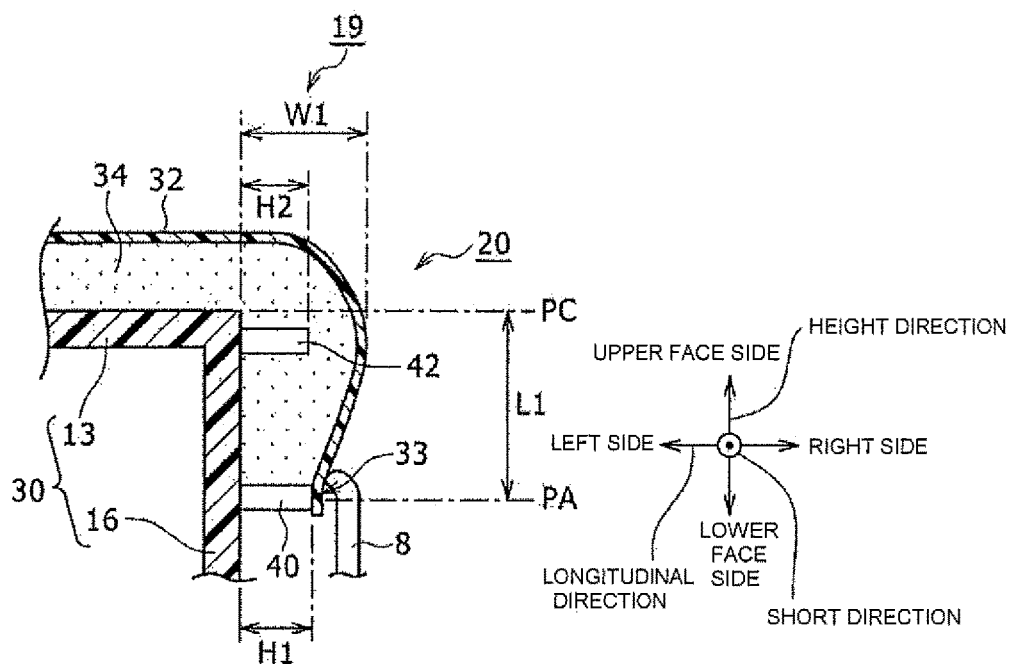
FIG. 3 is an expanded sectional view of part III of FIG. 2 of the instrument panel structure of the embodiment.

FIG. 3 is a sectional view of part III of FIG. 2. The instrument panel structure 20 in the widening portion 19 has a three-layered structure including a base material 30, a skin 32, and a foamed material 34.

The base material 30 is a member that forms the skeleton of the instrument panel 10, and is a hard resin member that has an upper face portion 13 extending in the longitudinal direction along with the upper face 12, and a side face portion 14, 16 which are both end portions in the longitudinal direction bent toward the lower face side. Such a base material 30 is formed by performing injection molding using acrylonitrile styrene glass fiber (ASG) resin, polycarbonate (PC) resin, polypropylene (PP) resin, or the like as the resin material, to form a predetermined shape.

The skin 32 is a soft resin member that is placed on the surface of the instrument panel 10 to form the external design of the instrument panel 10. Such a skin 32 is formed by performing powder slush molding in which a thermoplastic resin powder is distributed on the inner side of a mold and melted to form a predetermined shape. As the thermoplastic resin, olefin resins, urethane resins, polyvinyl chloride resin, or the like is used.

The foamed material 34 is a foaming resin that fills a space between the base material 30 and the skin 32 and has a cushioning property. Such a foamed material 34 is formed by injecting and expanding the foaming resin in a space between the base material 30 and the skin 32. Urethane foam is used as the foaming resin.

A sealing rib 40 is a member provided to join an end portion 33 of the skin 32 on the outer side in the longitudinal direction of the side face portion 16 of the base material 30, to form a sealing surface. The sealing rib 40 protrudes outward in the longitudinal direction from the side face portion 16 in an arrangement position PA spaced apart by a predetermined gap L1 toward the lower face side from a bent position PC of the base material 30, and the end portion 33 of the skin 32 is joined to a tip end face of the sealing rib 40. An appropriate adhesive is used as joining means.

In terms of design of the vehicle, the instrument panel 10 preferably extends toward the lower face side to a height position at the upper end of the side panel 8. Accordingly, the predetermined gap L1 regarding the sealing rib 40 is determined by a position of the upper face 12 of the instrument panel 10 in the height direction and a position of the upper end of the side panel 8 in the height direction, in the specification of the vehicle in which the instrument panel 10 is installed.

Compared to a case where the sealing rib 40 is not provided, the position of the sealing surface to which the end portion 33 of the skin 32 is joined is extended outward in the longitudinal direction of the instrument panel 10 by a protrusion height H1 of the sealing rib 40, and therefore a widening length W1 of the widening portion 19 is increased. Thus, the instrument panel 10 can be made wider in the longitudinal direction than the case where the sealing rib 40 is not provided.

A widening rib 42 is a member provided to improve texture of the widening portion 19 perceived by the user. The widening rib 42 protrudes outward in the longitudinal direction from the side face portion 16 of the base material 30, on the top face side of the arrangement position PA of the sealing rib 40 on the side face portion 16 of the base material 30. Since the foaming resin injected between the base material 30 and the skin 32 covers the widening rib 42 by foaming, the foamed material 34 is also formed between the base material 30 and the skin 32 on the outer side of a protrusion height H2 of the widening rib 42.

The protrusion height H1 of the sealing rib 40 and the protrusion height H2 of the widening rib 42 are limited by the flowability and formability of the foaming resin. According to experiments, in the case of urethane foam, the upper limit of both the protrusion height H1 of the sealing rib 40 and the protrusion height H2 of the widening rib 42 is about 12 mm. In this case, the widening length W1 of the widening portion 19 may be about 15 mm to 20 mm. These are examples for purposes of illustration, and changes may be made appropriately according to the flowability and formability of the foaming resin, and the specification of the instrument panel structure 20, for example.

Such a sealing rib 40 and a widening rib 42 are formed into predetermined shapes from an appropriate hard resin material. The same hard resin material as the base material 30 may be used. Combining means such as adhesion are used as means for attaching the sealing rib 40 and the widening rib 42 to the base material 30.

According to the above configuration, instead of the side face portion 16 of the base material 30, the tip end face of the sealing rib 40 is joined to the skin 32 to define the position of the sealing surface. Hence, the thickness of the foamed material 34 can be increased in both end portions in the longitudinal direction of the instrument panel 10. Moreover, even when the thickness of the foamed material 34 is increased in both end portions in the longitudinal direction of the instrument panel 10, since the foamed material 34 is supported by the widening rib 42, the foamed material 34 is not pushed in when touched by the user, and texture is improved. Thus, the instrument panel 10 can be widened in the longitudinal direction while maintaining texture perceived by the user.

Figure 4:
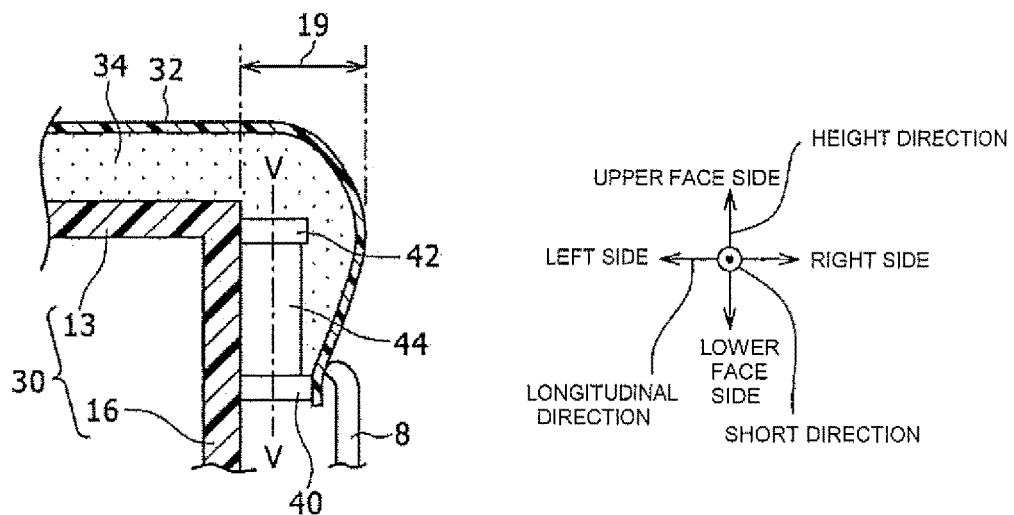
FIG. 4 is a diagram showing an example of a third rib in the instrument panel structure of the embodiment.
Figure 5:
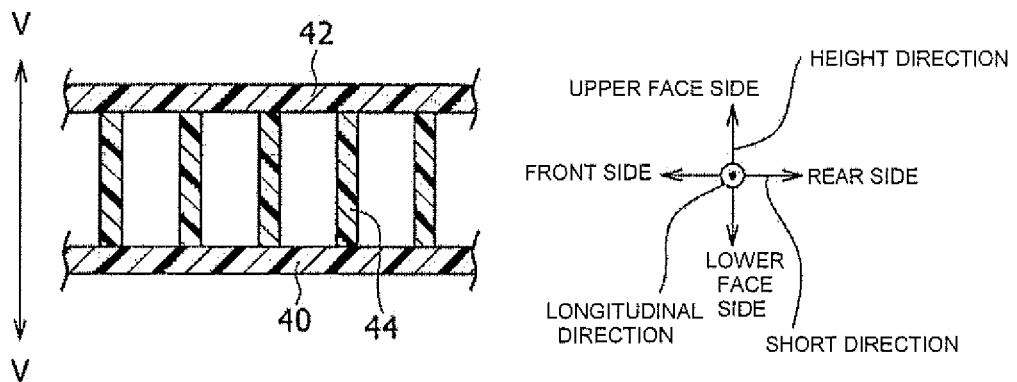
FIG. 5 is a sectional view taken along line V-V in FIG. 4.

FIG. 4 is a diagram showing an example where a third rib 44 is provided in a region between the sealing rib 40 and the widening rib 42 along the side face portion 16. The height of the third rib 44 is set to be not higher than the protrusion height H1 of the sealing rib 40 or the protrusion height H2 of the widening rib 42. Hence, the third rib 44 is also covered with the foamed material 34. FIG. 5 is a cross-sectional view taken along line V-V of FIG. 4. The third rib 44 is multiple plate members arranged in a direction perpendicular to the extending direction of the sealing rib 40 and the widening rib 42, and having one end connected to the sealing rib 40 and the other end connected to the widening rib 42. Such a third rib 44 is formed into a predetermined shape from an appropriate hard resin material. The same hard resin material as the base material 30, the sealing rib 40, and the widening rib 42 may be used. Combining means such as adhesion are used as means for connecting the third rib 44 to the sealing rib 40 and the widening rib 42. The third rib 44 may be connected with the base material 30.

By providing the third rib 44, texture perceived by the user can be maintained in the entire region between the sealing rib 40 and the widening rib 42. Additionally, since the sealing rib 40 and the widening rib 42 can be separated while maintaining texture, there is wider variety in the design of the instrument panel 10. Moreover, since the third rib 44 can be integrated by connecting one end to the sealing rib 40 and the other end to the widening rib 42, the strength of the base material 30 in the side face portion 16 can be improved.

Figure 6:
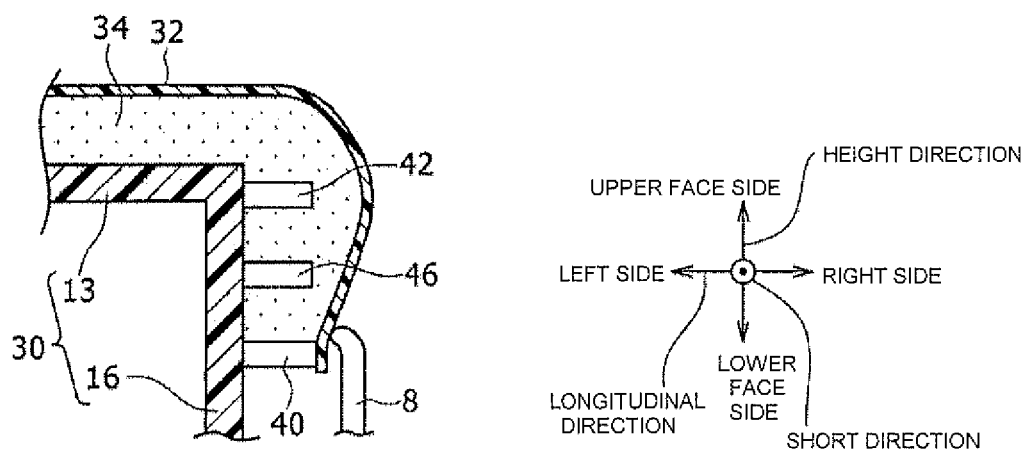
FIG. 6 is a diagram showing another example of the third rib in the instrument panel structure of the embodiment.

FIG. 6 is a diagram showing a third rib 46 of another example. The third rib 46 is a rib member protruding outward from the side face portion 16 in an intermediate position between the sealing rib 40 and the widening rib 42 in the vertical direction of the side face portion 16. The sealing rib 40, the widening rib 42, and the third rib 46 are arranged parallel to one another. By providing the third rib 46, too, texture perceived by the user can be maintained in the region between the sealing rib 40 and the widening rib 42. Hence, the sealing rib 40 and the widening rib 42 can be separated to allow wider variety in the design of the instrument panel 10.

Effects of the above configuration will be described in more detail by use of comparative examples with the conventional technique with reference to FIGS. 7 to 10.

Figure 7:
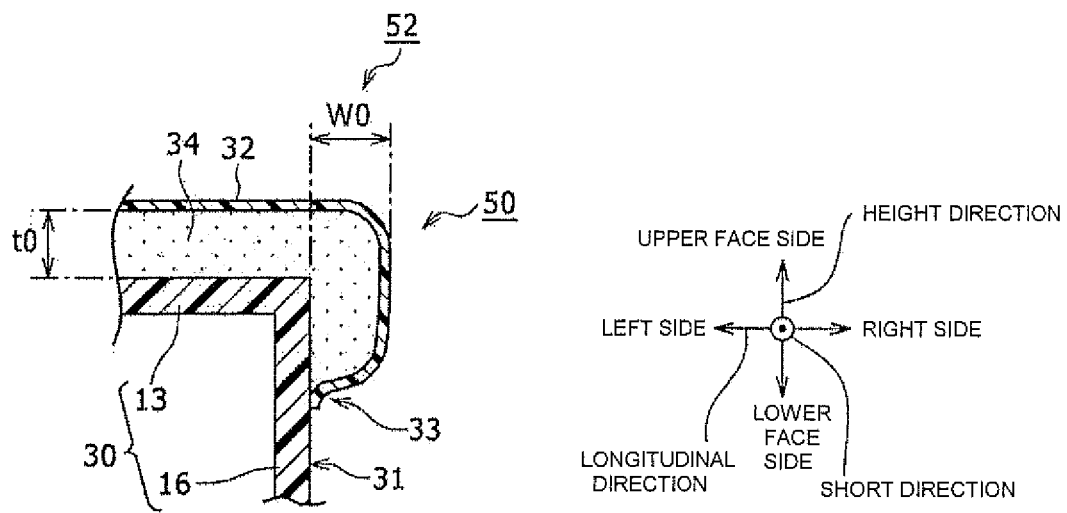
FIG. 7 is a sectional view of an instrument panel structure of a conventional technique as a comparative example.

FIG. 7 is a cross-sectional view of a general instrument panel structure 50. In the general instrument panel structure 50, a sealing surface is formed by directly joining an end portion 33 of a skin 32 to a general surface 31 which is an outer face of a side face portion 16 having less irregularities.

Accordingly, a widening length W0 of an instrument panel 10 extending in the longitudinal direction in a widening portion 52 is substantially the same as a thickness t0 of a foamed material 34 in an upper face portion 13 of a base material 30. As an example of the numeric values, t0 is about 3 mm to 4 mm, and therefore the widening length W0 of the widening portion 52 is also about 3 mm to 4 mm. These are examples for purposes of illustration, and changes may be made appropriately according to the specification of the instrument panel 10.

Figure 8:
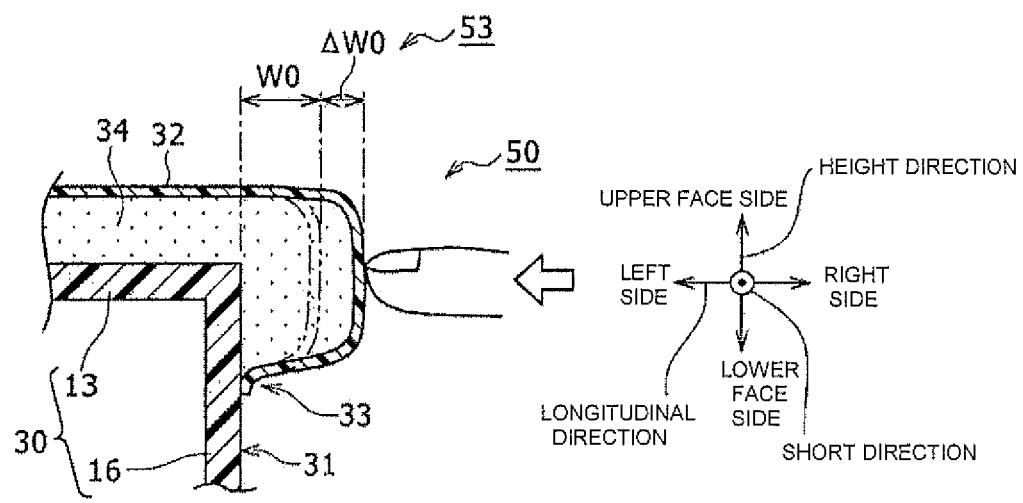
FIG. 8 is a diagram showing a case where the thickness of a foamed material is increased in FIG. 7.

FIG. 8 is a diagram showing a case where the thickness of the foamed material 34 in a widening portion 53 is increased to widening length (W0+ΔW0) in the example of FIG. 7. In this case, along with the increase in the widening length of the widening portion 53 from W0 to (W0+ΔW0), the thickness of the foamed material 34 in the widening portion 53 becomes larger than the thickness t0 of the foamed material 34 in the upper face portion 13. In the experiment, when t0 is about 3 mm to 4 mm and (W0+ΔW0) exceeds about 7 mm, the filling factor of the foamed material 34 decreases, and texture cannot be maintained since this part is more easily pushed in when touched by the user compared to the upper face portion 13. In this case, texture can be improved by using the widening rib 42 described with reference to FIG. 3.

Figure 9:
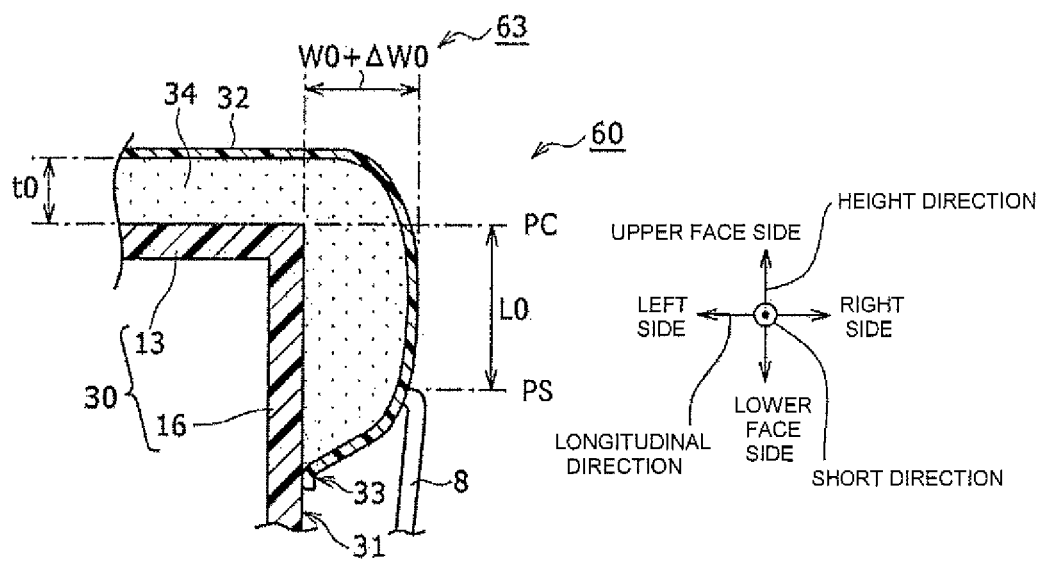
FIG. 9 is a diagram showing a case where the part of the thick foamed material is extended to a lower face side along a side face portion in FIG. 8.

A gap L0 between a position PC of an upper face 12 of an instrument panel 10 in the height direction and a height position PS of the upper end of a side panel 8 may be set long, depending on the specification of the vehicle in which the instrument panel 10 is installed. In terms of design of the vehicle, the instrument panel 10 preferably extends toward the lower face side to the height position PS of the upper end of the side panel 8. FIG. 9 is a diagram showing an example of an instrument panel structure 60 of a case where the gap L0 between the bent position PC of the upper face 12 of the instrument panel 10 and the height position PS of the upper end of the side panel 8 is set long. When the widening thickness of a widening portion 63 is set to a thickness (W0+ΔW0) thicker than a thickness t0 of a foamed material 34 in an upper face portion 13 to improve the basically horizontal design, as mentioned with reference to FIG. 8, the filling factor of a foamed material 34 drops after the thickness of the foamed material 34 in the widening portion 63 exceeds about 7 mm.

Figure 10:
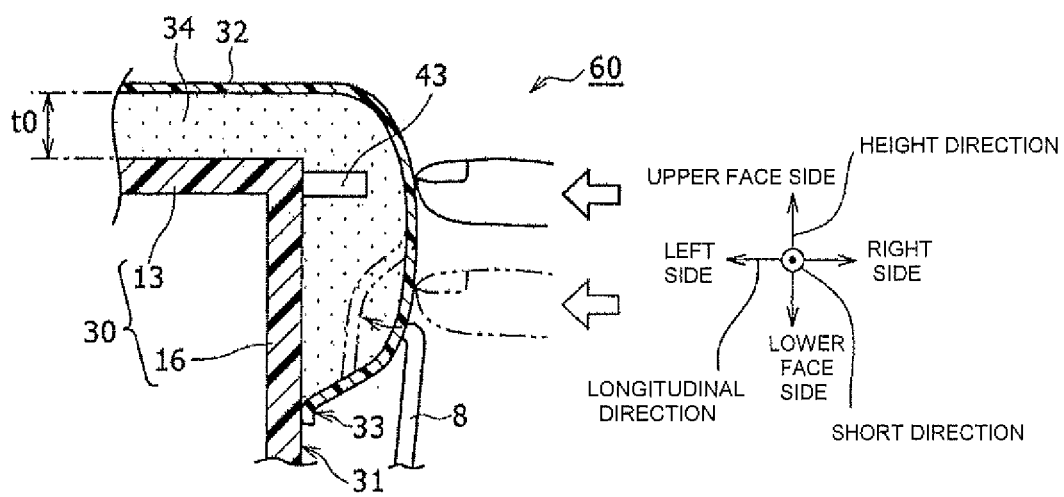
FIG. 10 is a diagram showing a case where a widening rib is provided in FIG. 9.

FIG. 10 is a diagram showing a case where a widening rib 43 is provided to prevent deterioration in texture due to a decrease in the filling factor of a foamed material 34. In this case, since the position of the sealing surface to which an end portion 33 of a skin 32 is joined is much closer to the lower face side than the example of FIG. 7, the region with low filling factor is wide, and texture cannot be maintained merely by providing a widening rib 43. For example, as indicated by a chain double-dashed line in FIG. 10, when a part of the region between the widening rib 43 and the position of the sealing surface of the end portion 33 is touched by the user, the skin 32 is pushed in since there is no widening rib 43, and texture cannot be maintained.

Additionally, in the examples of FIGS. 9 and 10, since the end portion 33 of the skin 32 is joined to a general surface 31 on the outer side of a side face portion 16 and having less irregularities, as mentioned with reference to FIG. 8, the widening length (W0+ΔW0) is limited to about 7 mm. In a vehicle built to have a long L0, an instrument panel structure with high-class design and a suitable widening length for the long L0 is desired.

According to the instrument panel structure 20 of FIG. 3, instead of the general surface 31 of the side face portion 16 of the base material 30, the tip end face of the sealing rib 40 can be joined to the end portion 33 of the skin 32. By setting both the protrusion height H2 of the widening rib 42 and the protrusion height H1 of the sealing rib 40 to about 12 mm, the widening length W1 of the widening portion 19 can be set to about 15 mm to 20 mm. Although the widening portion 19 on the right side in the longitudinal direction has been described above, the widening length W1 can similarly be set to about 15 mm to 20 mm for the widening portion 17 on the left side in the longitudinal direction. With this, even with a vehicle built to have a long L0, the basically horizontal instrument panel structure 20 with excellent design and a suitable widening length for the long L0 can be achieved.

The invention claimed is:

1. An instrument panel structure whose longitudinal direction is arranged between left and right side panels in a vehicle width direction, the instrument panel structure comprising:
   a base material that has both end portions in the longitudinal direction bent toward a lower face side to form side face portions;
   a foamed material that covers a surface of the base material;
   a skin that covers a surface of the foamed material;
   a sealing rib that protrudes outward in the longitudinal direction from the side face portion in an arrangement position spaced apart by a predetermined gap toward the lower face side from a bent position of the base material; and
   a widening rib that protrudes outward in the longitudinal direction from the side face portion on an upper face side of the arrangement position of the sealing rib on the side face portion, and an end of the widening rib is covered with the foamed material, wherein:
   an end portion of the skin is joined to the sealing rib such that a lower face side of the foamed material is closed by the sealing rib, and
   a tip end face of the sealing rib is joined to the skin to define a position of a sealing surface, wherein
   the position of the sealing surface includes a connection between the end portion of the skin and the tip end face of the sealing rib.

2. The instrument panel structure according to claim 1, further comprising:
   a third rib that is provided in a region between the sealing rib and the widening rib along the side face portion, and is covered with the foamed material.

3. The instrument panel structure according to claim 2, wherein the third rib has one end connected to the sealing rib and the other end connected to the widening rib.

4. The instrument panel structure according to claim 1, wherein the foamed material is provided between the widening rib and the skin.

5. The instrument panel structure according to claim 1, wherein the foamed material does not extend over the tip end face of the sealing rib.

\* \* \* \* \*